(12) United States Patent
Mahapatra

(10) Patent No.: US 10,148,741 B2
(45) Date of Patent: Dec. 4, 2018

(54) MULTI-HOMING LOAD BALANCING SYSTEM

(71) Applicant: Dell Products L.P., Round Rock, TX (US)

(72) Inventor: Sumanta Das Gajendra Mahapatra, West Bengal (IN)

(73) Assignee: Dell Products L.P., Round Rock, TX (US)

(*) Notice: Subject to any disclaimer, the term of this patent is extended or adjusted under 35 U.S.C. 154(b) by 391 days.

(21) Appl. No.: 14/857,293

(22) Filed: Sep. 17, 2015

(65) Prior Publication Data
US 2017/0085629 A1    Mar. 23, 2017

(51) Int. Cl.
| | |
|---|---|
| *G06F 15/173* | (2006.01) |
| *H04L 29/08* | (2006.01) |
| *H04L 12/773* | (2013.01) |
| *H04L 29/12* | (2006.01) |
| *H04L 12/721* | (2013.01) |
| *H04L 12/751* | (2013.01) |
| *H04L 12/803* | (2013.01) |

(52) U.S. Cl.
CPC .......... *H04L 67/1002* (2013.01); *H04L 45/02* (2013.01); *H04L 45/124* (2013.01); *H04L 45/60* (2013.01); *H04L 47/125* (2013.01); *H04L 61/2007* (2013.01); *H04L 61/2092* (2013.01); *H04L 67/1036* (2013.01); *H04L 61/6059* (2013.01)

(58) Field of Classification Search
CPC ................ H04L 67/1002; H04L 45/60; H04L 61/2007; H04L 61/2092; H04L 67/1036; H04L 61/6059

USPC ......................................................... 709/223
See application file for complete search history.

(56) References Cited

U.S. PATENT DOCUMENTS

| | | | | |
|---|---|---|---|---|
| 8,681,695 B1* | 3/2014 | Krishnan | ............ | H04L 61/2015 370/328 |
| 2004/0083306 A1* | 4/2004 | Gloe | ................. | H04L 29/12066 709/245 |
| 2005/0271015 A1* | 12/2005 | Nishida | ............. | H04W 36/0011 370/331 |
| 2009/0207821 A1* | 8/2009 | Rune | ..................... | H04L 45/026 370/338 |
| 2012/0314624 A1* | 12/2012 | Asati | ................... | H04L 61/1511 370/257 |

* cited by examiner

*Primary Examiner* — SM A Rahman
(74) *Attorney, Agent, or Firm* — Haynes and Boone, LLP

(57) ABSTRACT

A multi-homing load balancing system includes a plurality of router devices that are coupled to a client device. The client device receives a respective router advertisement from each of the plurality of router devices that includes a link-local address for that router device. In response, the client device provides a neighbor solicitation to each of the plurality of router devices that includes the plurality of link-local addresses that were received in the router advertisements. One of the plurality of router devices then responds to the neighbor solicitation by selecting a first link-local address of the plurality of link-local addresses that were included in the neighbor solicitation and providing the first link-local address to the client device in a neighbor advertisement. The client device selects a first router device associated with the first link-local address as a default router device in response to receiving the neighbor advertisement.

14 Claims, 17 Drawing Sheets

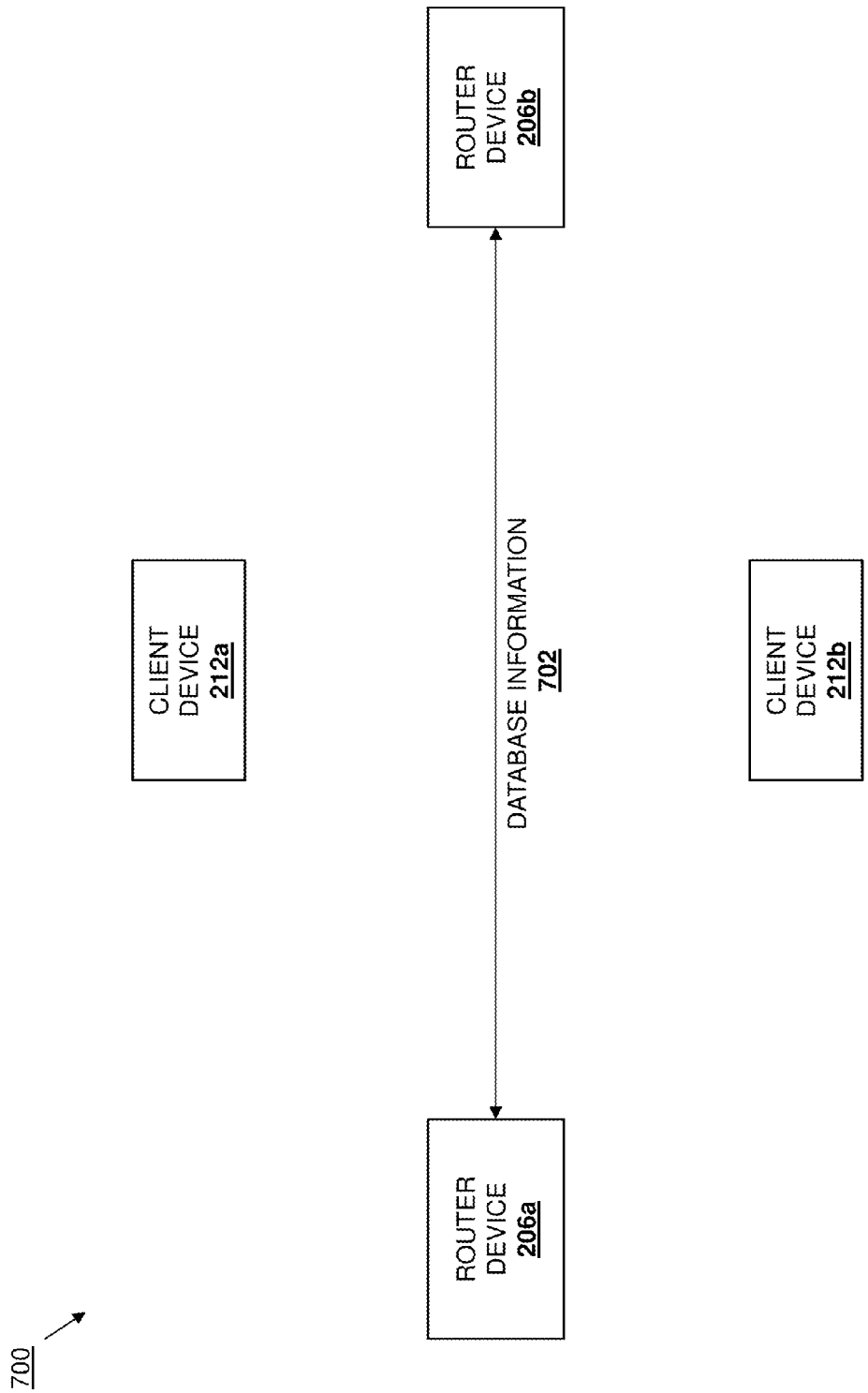

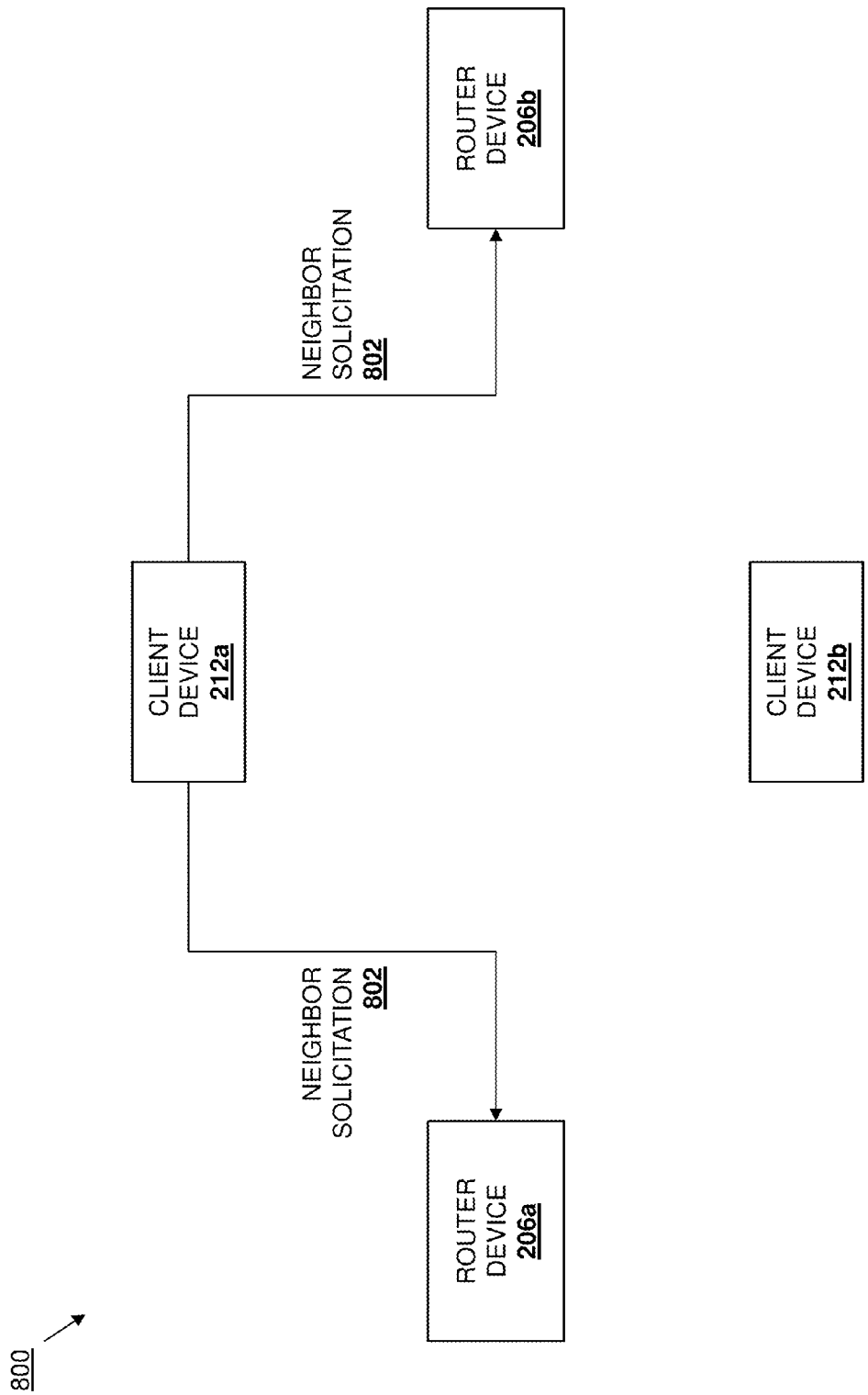

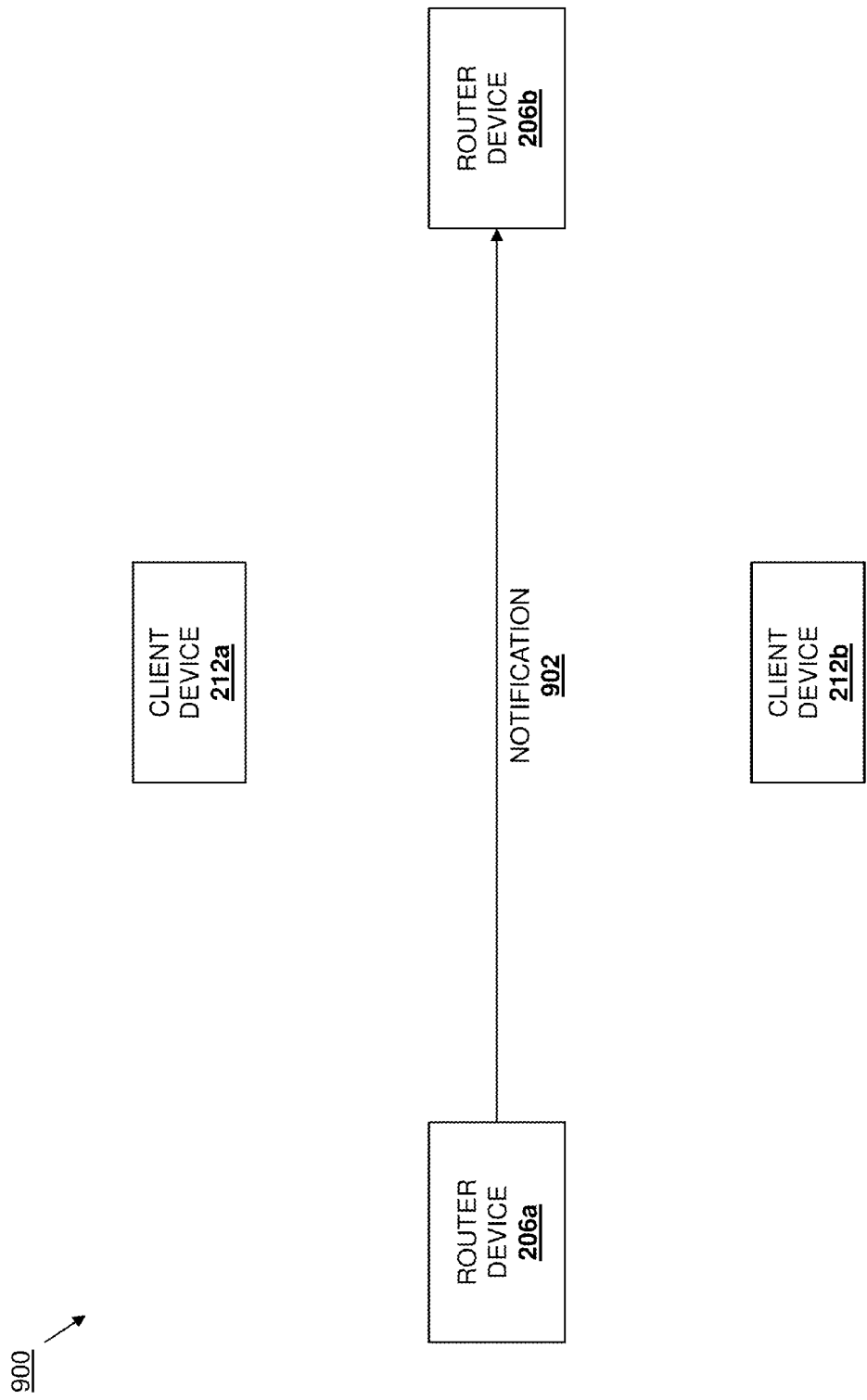

| TYPE | CODE | CHECKSUM | | |
|------|------|----------|---|---|
| 1 | RESERVED | | | |

| TYPE | LENGTH | MAC ADDRESS 906c | MAC ADDRESS 906d | NUMBER OF CLIENT DEVICES 906b | MAC ADDRESS 906e | LINK-LOCAL ADDRESS 906a |
|------|--------|------------------|------------------|-------------------------------|------------------|-------------------------|
| LINK-LOCAL ADDRESS 906a | | | | | | |

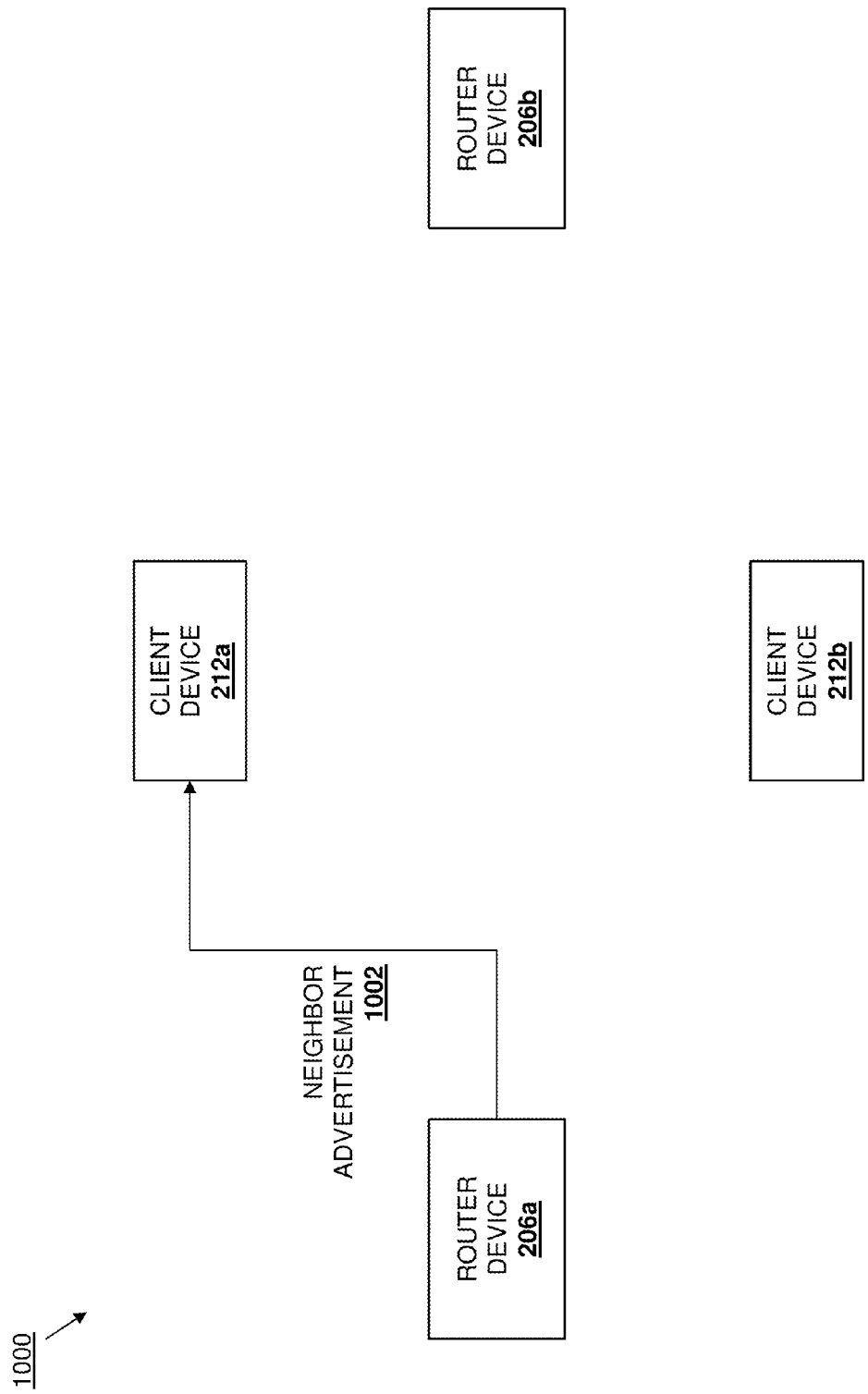

MULTI-HOMING LOAD BALANCING SYSTEM

BACKGROUND

The present disclosure relates generally to information handling systems, and more particularly to a load balancing system for multi-homed information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many situations, information handling systems such as, for example, client devices, may be connected to more than one computer network in a configuration that is referred to as "multi-homing". Such configurations may be provided in order to, for example, increase the reliability of an Internet Protocol (IP) network when client devices are served by more than one Internet Service Provider. In many networked systems including multi-homed client devices, it may be desirable to perform load balancing in the networked system to distribute workloads across multiple computing resources such as, for example, router devices. However, the use of load balancing in networked systems with multi-homed client devices can raise issues.

For example, in networked systems that communicate using the Internet Protocol version 6 (IPv6), client devices may select and use a default router device from a plurality of router devices in order to communicate outside of their Local Area Network (LAN). The selection of the default router device from the plurality of router devices is made in response to router advertisements from the plurality of router devices. However, that selection is typically random, which can result in several client devices selecting the same default router device, and can lead to unpredictable traffic flows where a majority of the network traffic flows through a single router device when multiple router devices are available.

Conventional solutions to load balancing router devices in a multiple router device system include the Gateway Load Balancing Protocol (GLBP), which is an extension of the Virtual Routing Redundancy Protocol (VRRP). However, when using GLBP in an IPv6 networked system, the default IPv6 link-local address may be shared by each of the devices, which results in clients selecting source addresses using, for example, source address selection based on the next hop address. However, the use of source address selection based on the next hop address can lead to unpredictable source address selection, and the selection of an incorrect source address will cause the traffic from that client device to be dropped by an Internet Service Provider performing source filtering. Solutions such as Virtual Link Trunking (VLT) suffer from similar issues.

Accordingly, it would be desirable to provide an improved multi-homing load balancing system.

SUMMARY

According to one embodiment, an information handling system (IHS) includes a communication system that is configured to couple to a client device; a processing system that is coupled to the communication system; and a memory system that is coupled to the processing system and that stores a first link-local address, wherein the memory system includes instructions that, when executed by the processing system, cause the processing system to provide a default router determination engine that is configured to: send, through the communication system to the client device, a router advertisement that includes the first link-local address; receive, through the communication system from the client device, a neighbor solicitation that includes a plurality of link-local addresses that include the first link-local address and at least one second link-local address; and respond to the neighbor solicitation by selecting one of the plurality of link-local addresses that were included in the neighbor solicitation and providing, through the communication system to the client device, that link-local address in a neighbor advertisement that is configured to cause the client device to select a first router device associated with that link-local address as a default router device.

BRIEF DESCRIPTION OF THE DRAWINGS

FIG. 6b is a schematic view illustrating an embodiment of a communication packet used in the communications of FIG. 6a.

FIG. 7a is a communication diagram illustrating communications in the multi-homing load balancing system of FIG. 2 during the method of FIG. 5.

FIG. 7b is a schematic view illustrating an embodiment of a communication packet used in the communications of FIG. 7a.

FIG. 7c is a schematic view illustrating an embodiment of the router device of FIG. 3 in response to the communications of FIG. 7a.

FIG. 8a is a communication diagram illustrating communications in the multi-homing load balancing system of FIG. 2 during the method of FIG. 5.

FIG. 8b is a schematic view illustrating an embodiment of a communication packet used in the communications of FIG. 8a.

FIG. 9a is a communication diagram illustrating communications in the multi-homing load balancing system of FIG. 2 during the method of FIG. 5.

FIG. 9b is a schematic view illustrating an embodiment of a communication packet used in the communications of FIG. 8a.

FIG. 10a is a communication diagram illustrating communications the multi-homing load balancing system of FIG. 2 during the method of FIG. 5.

FIG. 10b is a schematic view illustrating an embodiment of a communication packet used in the communications of FIG. 6a.

FIG. 11 is a schematic view illustrating an embodiment of the client device of FIG. 4 in response to the communications of FIG. 10a.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
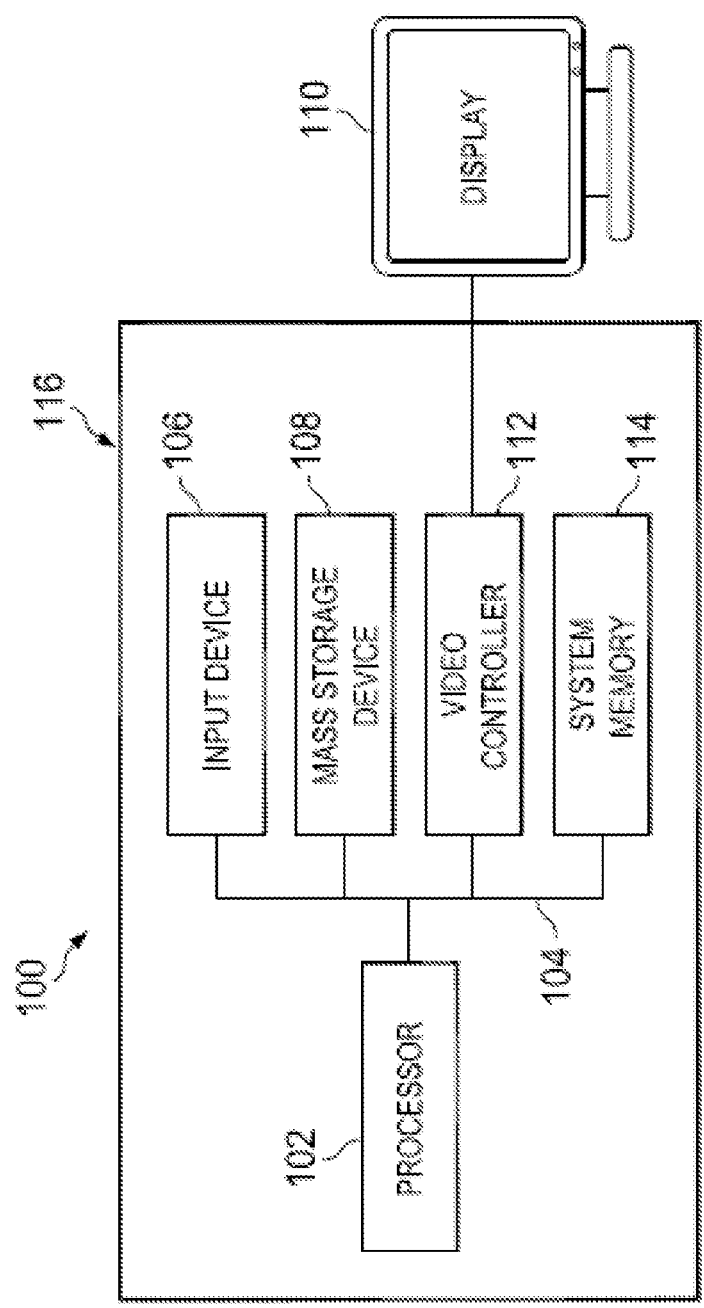
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
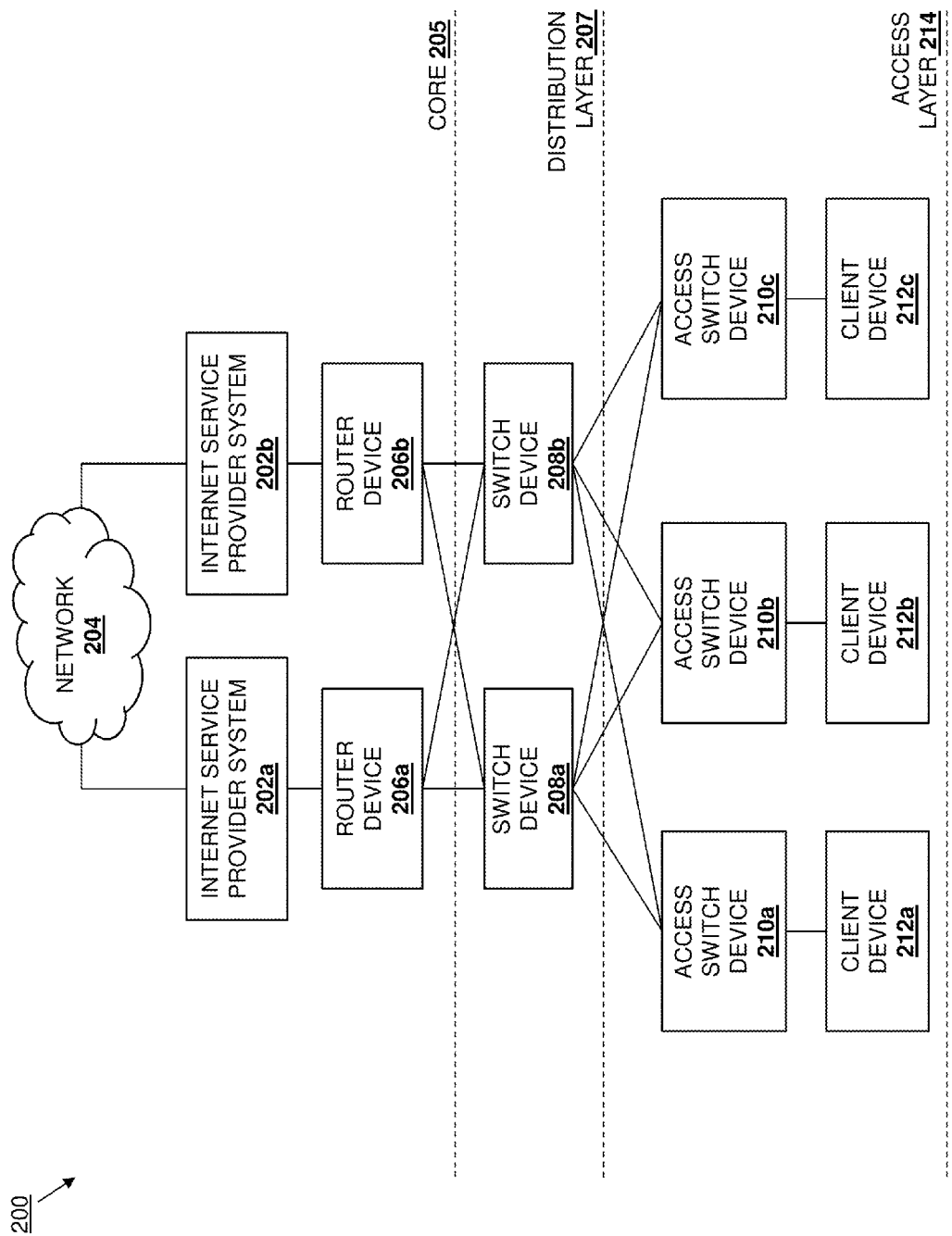
FIG. 2 is a schematic view illustrating an embodiment of a multi-homing load balancing system.

Referring now to FIG. 2, an embodiment of a multi-homing load balancing system 200 is illustrated. In the illustrated embodiment, the multi-homing load balancing system 200 includes a plurality of Internet Service Provider systems 202a and 202b that are coupled to a network 204 such as, for example, the Internet. Either or both of the Internet Service Provider systems 202a and 202b may be the IHS 100 discussed above with reference to FIG. 1 and/or may include some or all of the components of the IHS 100. While only two Internet Service Provider systems 202a and 202b are illustrated, any number of Internet Service Provider systems are envisioned as falling within the scope of the present disclosure. The Internet Service Provider systems 202a and 202b are each coupled to a respective router device 206a and 206b. Either or both of the router devices 206a and 206b may be the IHS 100 discussed above with reference to FIG. 1 and/or may include some or all of the components of the IHS 100. As is know in the art, the Internet Service Provider systems 202a and 202b, the router devices 206a and 206b, and the network 204 may be considered part of a core 205 of the multi-homing load balancing system 200, and may include high-speed, highly redundant forwarding services that move traffic between different distribution layers in a network systems to provide various core network services to users that are connected to an access layers of the networked system.

The multi-homing load balancing system 200 also includes a plurality of switch devices 208a and 208b (which each are directly coupled to each of the router devices 206a and 206b) that each may be the IHS 100 discussed above with reference to FIG. 1 and/or may include some or all of the components of the IHS 100. As is know in the art, the switch devices 208a and 208b may be considered part of a distribution layer 207 of the multi-homing load balancing system 200, and may provide for routing, filtering, and quality of service policies. The multi-homing load balancing system 200 also includes a plurality of access switch devices 210a, 210b, and 210c (which each are directly coupled to each of the switch devices 208a and 208b) that each may be the IHS 100 discussed above with reference to FIG. 1 and/or may include some or all of the components of the IHS 100. A client device 212a is coupled to the access switch device 210a, a client device 212b is coupled to the access switch device 210b, a client device 212c is coupled to the access switch device 210c, and each of the client devices 212a-c may be the IHS 100 discussed above with reference to FIG. 1 and/or may include some or all of the components of the IHS 100. As is know in the art, the access switch devices 210a-c and the client devices 212a-c may be considered part of an access layer 214 of the multi-homing load balancing system 200, and may include end stations and servers accessing services in the core 205 of the networked system. While a specific embodiment of the multi-homing load balancing system 200 is illustrated and described herein, one of skill in the art in possession of the present disclosure will recognize that the teachings provided herein may be beneficial to a variety of other load balancing systems known in the art. As such, different devices and systems may be utilized in place of those illustrated (e.g., the Internet Service Provider systems 202*a* and 202*b*) and provided in different configurations while remaining within the scope of the present disclosure.

Figure 3:
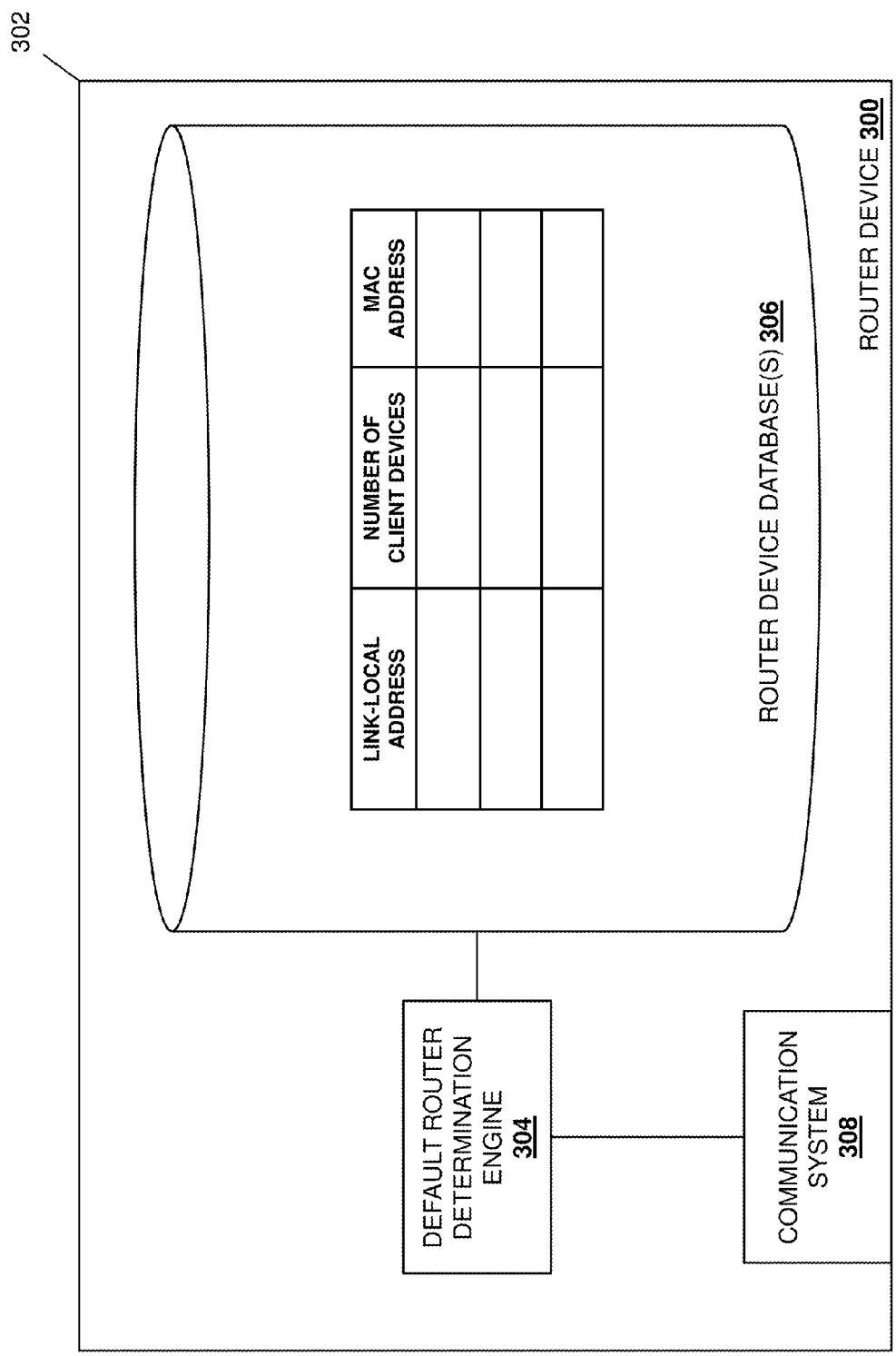
FIG. 3 is a schematic view illustrating an embodiment of a router device used on the multi-homing load balancing system of FIG. 2.

Referring now to FIG. 3, an embodiment of a router device 300 is illustrated. In an embodiment, the router device 300 may be either or both of the router devices 206*a* and 206*b* discussed above with reference to FIG. 2. As such, the router device 300 may be the IHS 100 discussed above with reference to FIG. 1 and/or may include some or all of the components of the IHS 100. The router device 300 includes a chassis 302 that houses the components of the router device 300, only some of which are illustrated for clarity. One of skill in the art in possession of the present disclosure will recognize that the router device 300 may include a variety of router device components that provide for conventional router device functionality while remaining within the scope of the present disclosure. In the illustrated embodiment, the chassis 302 houses a processing system (not illustrated, but which may include the processor 102 discussed above with reference to FIG. 1) and a memory system (not illustrated, but which may include the system memory 114 discussed above with reference to FIG. 1) that includes instruction that, when executed by the processing system, cause the processing system to provide a default router determination engine 304 that is configured to perform the functions of the default router determination engines and router devices discussed below.

The chassis 302 may also house a storage system (not illustrated, but which may include the storage device 108 discussed above with reference to FIG. 1) that includes one or more router device databases 306 that are coupled to the default router determination engine 304 (e.g., via a coupling between the processing system and the storage system). The router device database(s) 306 may include one or more data structures that associate link-local addresses of router devices with numbers of client devices and client device addresses (e.g., the Media Access Control (MAC) addresses in the illustrated embodiment), as discussed in further detail below. While illustrated as housed in the chassis 302, the router device database(s) 306 may be external to the chassis 302 and coupled to the default router determination engine 304 via a network or other connection while remaining within the scope of the present disclosure. The default router determination engine 304 is also coupled to a communication system 308 (e.g., via a coupling between the processing system and the communication system 308) that is housed in the chassis 302 and that may include a Network Interface Controller (NIC), a wireless communication device, and/or other communication components known in the art that enable the router device 300 to be coupled to Internet Service Provider systems (e.g., the Internet Service Provider systems 202*a* and 202*b* in FIG. 2), switch devices (e.g., the switch devices 208*a* and 208*b* in FIG. 2), and/or other network components known in the art. While a specific router device 300 has been illustrated, one of skill in the art in possession of the present disclosure will recognize that other router devices and/or networking equipment may benefit from the teachings of the present disclosure, and thus the application of those teachings to such systems will fall within the scope of the present disclosure.

Figure 4:
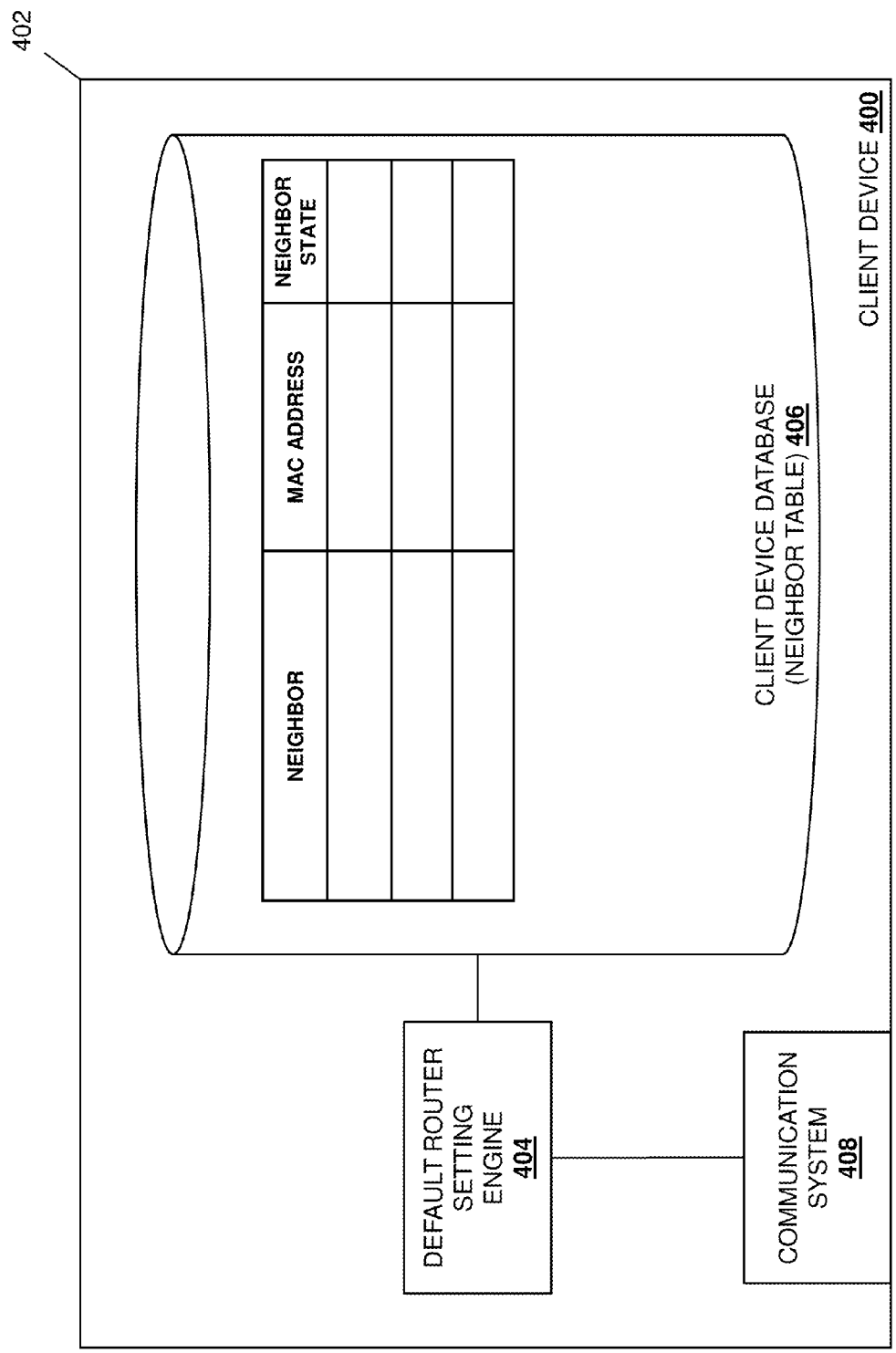
FIG. 4 is a schematic view illustrating an embodiment of a client device used on the multi-homing load balancing system of FIG. 2.

Referring now to FIG. 4, an embodiment of a client device 400 is illustrated. In an embodiment, the client device 400 may be any or all of the client devices 212*a*, 212*b*, and 212*c* discussed above with reference to FIG. 2. As such, the client device 400 may be the IHS 100 discussed above with reference to FIG. 1 and/or may include some or all of the components of the IHS 100. The client device 400 includes a chassis 402 that houses the components of the client device 400, only some of which are illustrated for clarity. One of skill in the art in possession of the present disclosure will recognize that the client device 400 may include a variety of client device components that provide for conventional client device functionality while remaining within the scope of the present disclosure. In the illustrated embodiment, the chassis 402 houses a processing system (not illustrated, but which may include the processor 102 discussed above with reference to FIG. 1) and a memory system (not illustrated, but which may include the system memory 114 discussed above with reference to FIG. 1) that includes instruction that, when executed by the processing system, cause the processing system to provide a default router setting engine 404 that is configured to perform the functions of the default router setting engines and client devices discussed below.

The chassis 402 may also house a storage system (not illustrated, but which may include the storage device 108 discussed above with reference to FIG. 1) that includes one or more client device databases 406 that are coupled to the default router setting engine 404 (e.g., via a coupling between the processing system and the storage system). The router device database(s) 406 may include one or more data structures that associate neighbors, client device addresses (e.g., the Media Access Control (MAC) addresses in the illustrated embodiment), and neighbor states, as discussed in further detail below. While illustrated as housed in the chassis 402, the client device database(s) 406 may be external to the chassis 402 and coupled to the default router setting engine 404 via a network or other connection while remaining within the scope of the present disclosure. The default router setting engine 404 is also coupled to a communication system 408 (e.g., via a coupling between the processing system and the communication system 408) that is housed in the chassis 302 and that may include a Network Interface Controller (NIC), a wireless communication device, and/or other communication components known in the art that enable the client device 400 to be coupled to access switch device (e.g., the access switch devices 210*a*-*c* in FIG. 2) and/or other network components known in the art. While a specific client device 400 has been illustrated, one of skill in the art in possession of the present disclosure will recognize that other client devices and/or computing equipment may benefit from the teachings of the present disclosure, and thus the application of those teachings to such systems will fall within the scope of the present disclosure.

Figure 5:
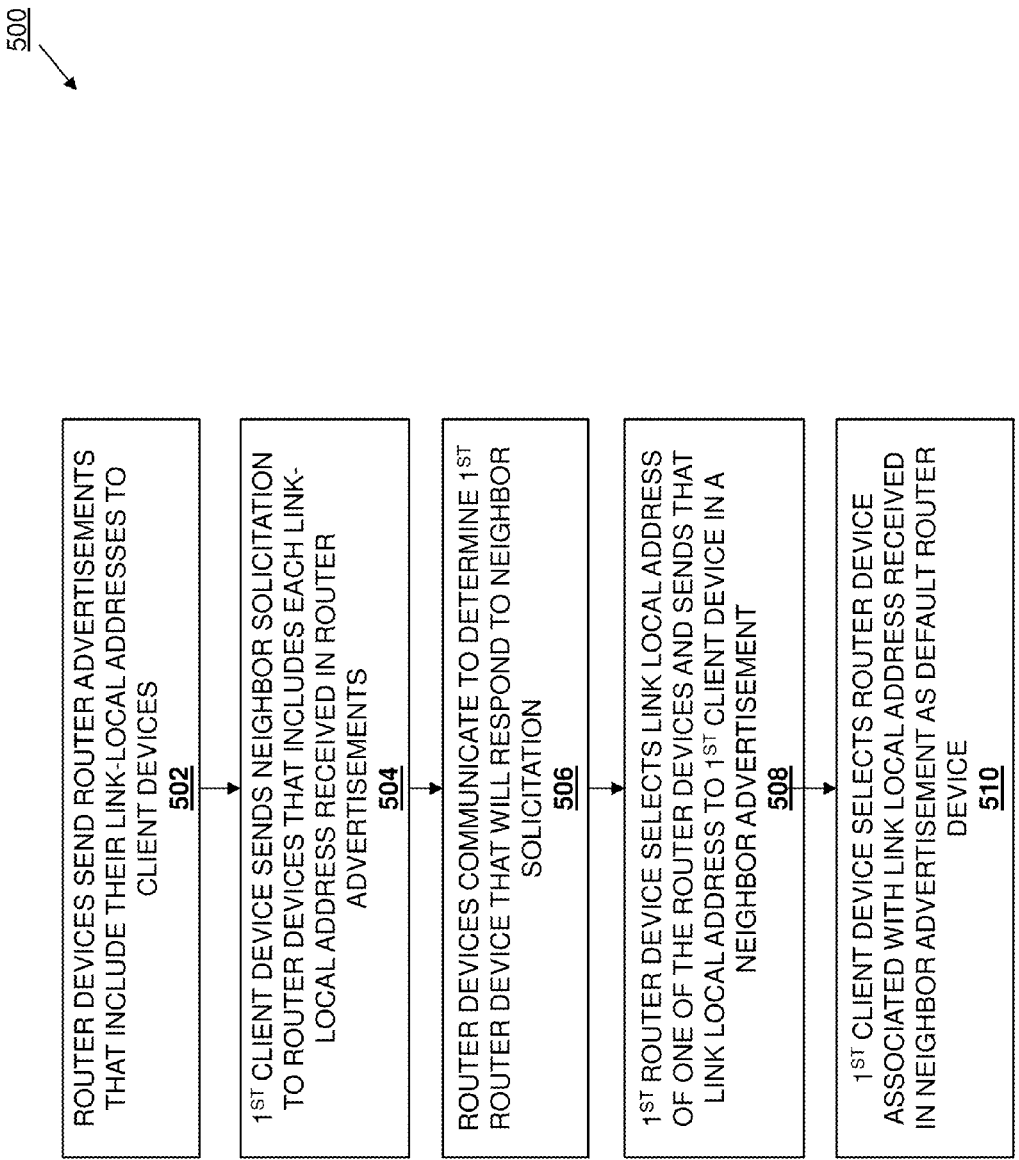
FIG. 5 is a flow chart illustrating an embodiment of a method for load balancing in a multi-homing system.

Referring now to FIG. 5, an embodiment of a method 500 for load balancing a multi-homing system is illustrated. As discussed above, in some multi-homing systems such as, for example, IPv6 multi-homing systems, conventional load balancing techniques can suffer from a number of issues due to the default router device selection according to those techniques being non-determinative, which may concentrate traffic from multiple client devices to a single router device when other router devices are available. As described below, embodiments of the systems and methods of the present disclosure provide for the selection of default router devices by client devices that will provide for a relatively even distribution of traffic across a plurality of router devices available in the multi-homing system, thus providing for load balancing that does not suffer from the issues that occur when conventional load balancing methods are applied to multi-homing systems.

In the specific embodiments discussed below, such benefits are enabled via the Neighbor Discovery Protocol used with IPv6 by having the router devices in the multi-homing system provide router advertisements with a non-zero router lifetime field that causes client devices to store the source address in the router advertisements as link-local addresses for potential default routers. When the client devices need to select a default router device, they send a neighbor solicitation including app potential default router link-local addresses to all the router device, and one of the router devices selects one of those link-local addresses and provides it to the client device as a target address in a neighbor advertisement. The router device will then select the router device associated with the link-local address provided as the target address in the router advertisement as its default router device, and as discussed below, the selection of the link-local addresses by the router devices is performed such that client devices in the multi-homing system select default router devices in a determinative manner that results in traffic loads in the multi-homing system being relatively evenly distributed across the router devices available in the multi-homing system. In the example provided below, communications between two of the router devices 206a and 206b and two of the client devices 212a and 212b in the embodiment of the multi-homing load balancing system 200 of FIG. 2 are illustrated and described. However, one of skill in the art in possession of the present disclosure will recognize that any number of router devices and client devices may communicate in the manner described below while remaining within the scope of the present disclosure.

Figure 6A:
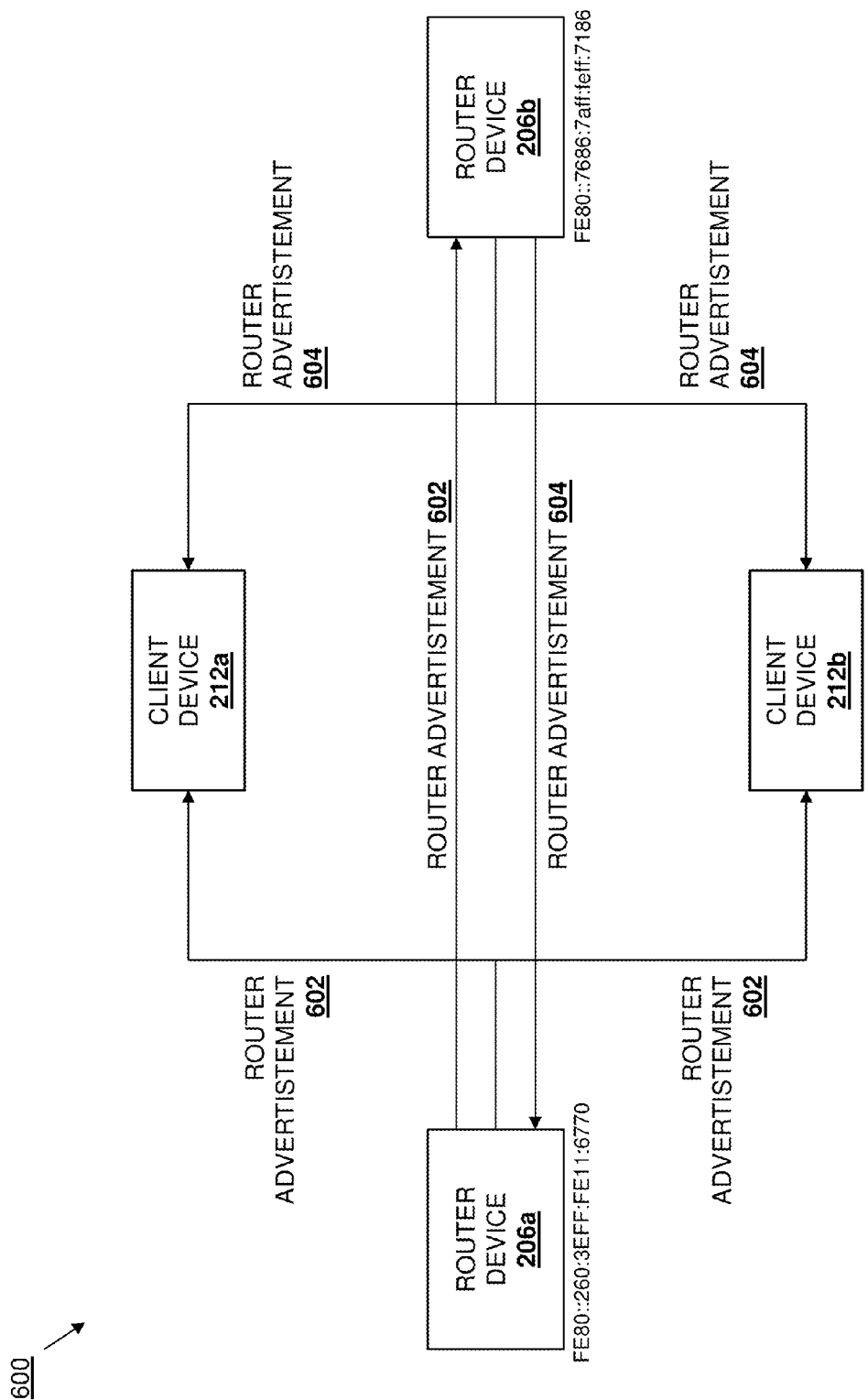
FIG. 6a is a communication diagram illustrating communications in the multi-homing load balancing system of FIG. 2 during the method of FIG. 5.

The method 500 begins at block 502 where router devices send router advertisements that include their link-local addresses to client devices. Referring to FIG. 6a, communications 600 in which the router devices 206a and 206b send router advertisements to the client devices 212a and 212b is illustrated. In an embodiment, the default router determination engine 304 in the router device 206a may generate and send a router advertisement 602 that includes a link-local address of the router device 206a (e.g., "FE80::260:3EFF:FE11:6770" in the illustrated embodiment) to each of the client devices 212a and 212b, as well as to the router device 206b. Similarly, the default router determination engine 304 in the router device 206b may generate and send a router advertisement 604 that includes a link-local address of the router device 206b (e.g., "FE80::7686:7aff:feff:7186" in the illustrated embodiment) to each of the client devices 212a and 212b, as well as to the router device 206a.

Figure 6B:
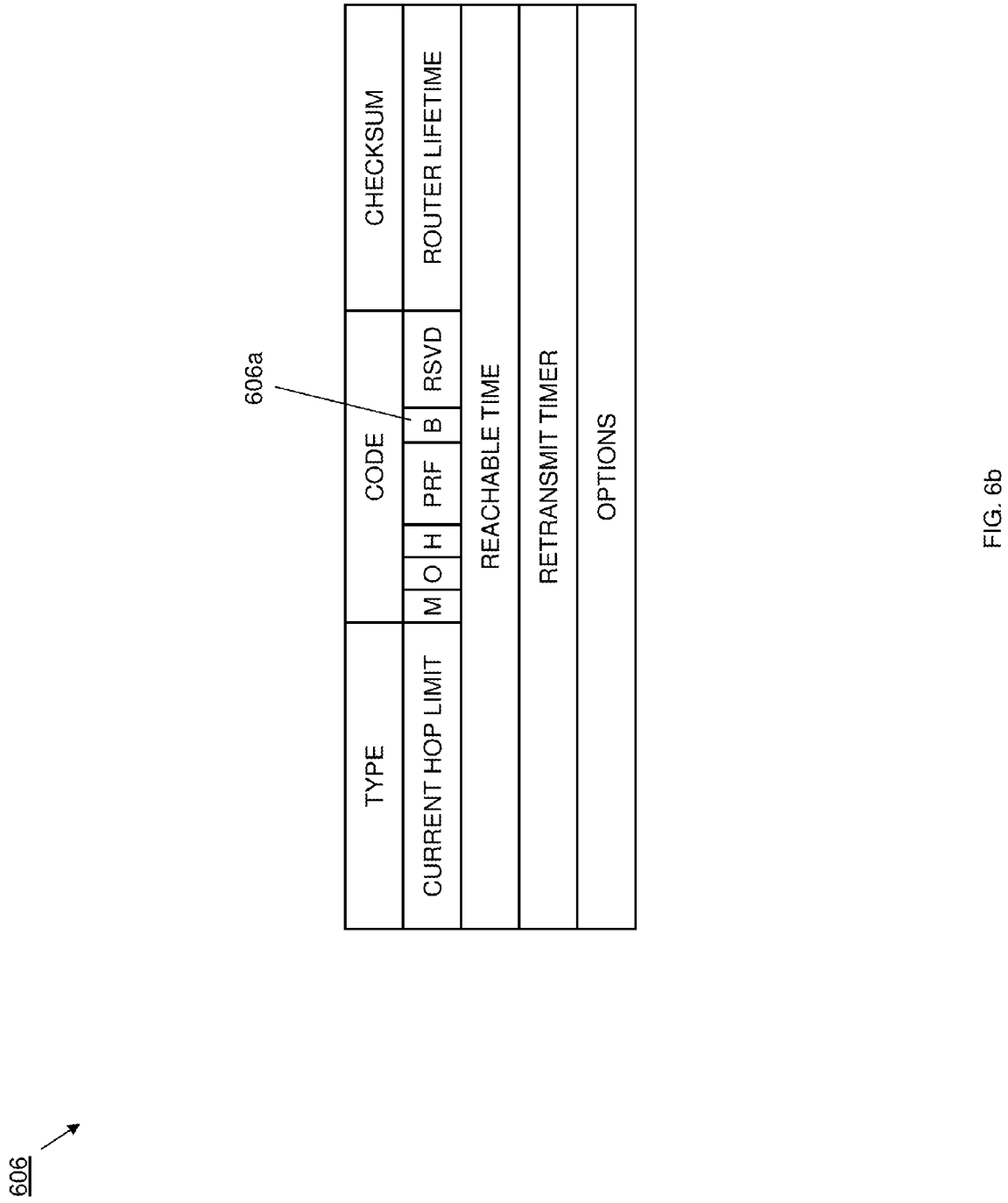

FIG. 6b illustrates an embodiment of a router advisement packet 606 that may be either of the router advertisements 602 and 604. In the specific example of FIG. 6b, the router advertisement packet 606 may be a type 134 packet according to the Neighbor Discovery Protocol and, as such, may include a variety of link parameters, Internet parameters, and/or other conventional router advertisement information known in the art. However, in the illustrated embodiment the router advertisement packet 606 also include a flag 606a (indicated by the letter "B" for balancing) that has been set to identify to the client devices 212a and 212b that multi-homing load balancing operations may be performed. For example, the flag 606a may be a router advertisement flag that has been set in one of the reserved fields in the router advertisement packet 606. In an embodiment, the link-local address of the router device sending the router advertisement packet 606 may be provided in a source address field of the router advertisement packet 606 (not illustrated). The router advertisements 602 and 604 may be sent periodically by the router devices 206a and 206b, in response to a router solicitation (e.g., a type 133 packet according to the Neighbor Discovery Protocol), and/or in a variety of other manners while remaining within the scope of the present disclosure. While a specific router advertisement packet is illustrated and described herein, one of skill in the art in possession of the present disclosure will recognize that router advertisements may take a variety of forms and be sent in a variety of manners that will fall within the scope of the present disclosure.

Referring now to FIG. 7a, in some embodiments, in response to receiving a router advertisement, router devices in the multi-homing load balancing system 200 that are enabled to perform the multi-homing load balancing operations described herein may perform communications 700 to share information in their router device database(s) 306 with the others of the routing devices in the multi-homing load balancing system 200. In an embodiment, the default router determination engine 304 in the router devices 206a and 206b may receive the router advertisement 602 or 604 through the communication system 308 and, in response to determining that the flag 606a in the router advertisement packet 606 has been set, may perform operations to send database information 702 to the other router device(s) through the communication system 308. As discussed below, link-local addresses may be associated with client device information in the router device database(s) 306, and thus any router device in the multi-homing load balancing system 200 that includes link-local address/client device information associations in their router device database(s) 306 may share those link-local address/client device information associations with a router device from which they receive a router advertisement and, in some examples, all the router devices in the system (e.g., via an "all routers" address). As such, the default router determination engine 304 in the router devices 206a and 206b may determine that the flag 606a has been set in a received router advertisement packet 606 (and in some embodiments whether the received link-local address/client device information association(s) are present in the router device database(s) 306) and in response, perform operations to retrieve link-local address/client device address associations from the router device database(s) 306 and send those link-local address/client device address associations to the router device from which the router advertisement packet 606 was received.

If a router device in the multi-homing load balancing system 200 does not include link-local address/client device information associations from the router device database(s) 306, that router device will not perform the sharing of information in its router device database(s) 306. As would be understood by one of skill in the art in possession of the present disclosure, router devices in the multi-homing load balancing system 200 that are not enabled to perform the multi-homing load balancing operations described herein will ignore the flag 606a set in the router advertisement packet 606 (as it is a reserved router advertisement flag), and will instead process the router advertisement packet 606 conventionally.

Figure 7B:
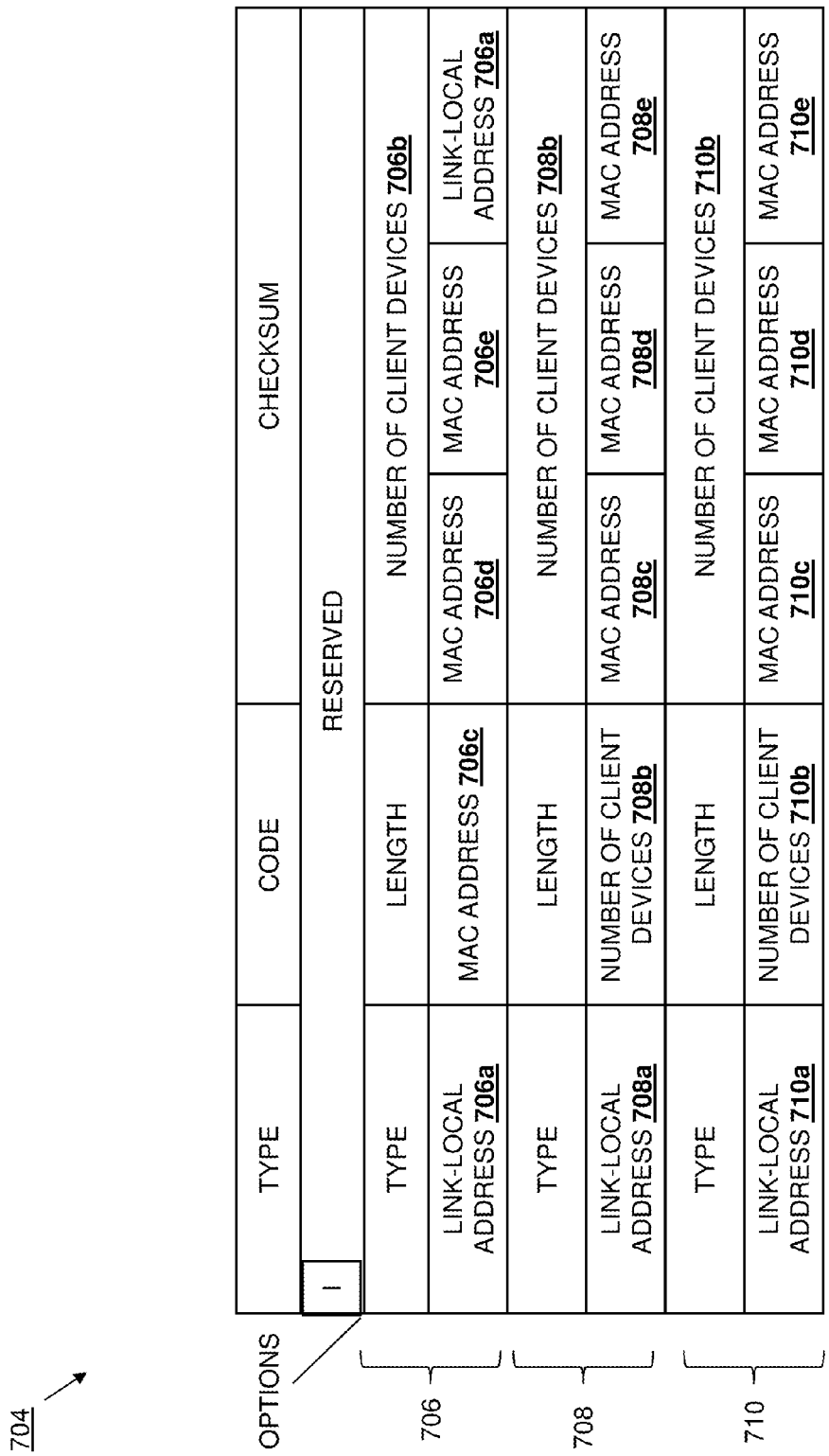

FIG. 7b illustrates an embodiment of a database information packet 704 that may be database information 702 sent from either or both of the router devices 206a and 206b. In the illustrated embodiment, the database information packet 704 includes a plurality of rows 706, 708, and 710. For example, the row 706 includes a link-local address 706a that is used by one of the router devices in the multi-homing load balancing system 200, along with an entry 706b including a number of client devices that have selected the routing device associated with the link-local address 706a as their default router device (discussed in further detail below), and entries 706c, 706d, and up to 706e that include client device address(es) (e.g., MAC addresses in the illustrated embodiment) for the client devices that have selected the routing device associated with the link-local address 706a as their default router device. Similarly, the row 708 includes a link-local address 708a that is used by one of the router devices in the multi-homing load balancing system 200, along with an entry 708b including a number of client devices that have selected the routing device associated with the link-local address 708a as their default router device (discussed in further detail below), and entries 708c, 708d, and up to 708e that include client device address(es) (e.g., MAC addresses in the illustrated embodiment) for the client devices that have selected the routing device associated with the link-local address 708a as their default router device; and the row 710 includes a link-local address 710a that is used by one of the router devices in the multi-homing load balancing system 200, along with an entry 710b including a number of client devices that have selected the routing device associated with the link-local address 710a as their default router device (discussed in further detail below), and entries 710c, 710d, and up to 710e that include client device address(es) (e.g., MAC addresses in the illustrated embodiment) for the client devices that have selected the routing device associated with the link-local address 710a as their default router device. While a specific database information packet is illustrated and described herein, one of skill in the art in possession of the present disclosure will recognize that the database information shared between the router devices may take a variety of forms and be sent in a variety of manners that will fall within the scope of the present disclosure.

In an embodiment, if a router device receives a router advertisement with a router lifetime set at zero, then the router device that sent that router advertisement will not act as a default router, and the router device receiving that router advertisement will not respond to that router device. Furthermore, client devices will not select a router device as a default router device if a router advertisement is received from that router device with a router lifetime set at zero, so any previous associations between client devices and router devices that send router advertisements with the router lifetime set at zero will be removed from the router device database(s) 306.

Figure 7C:
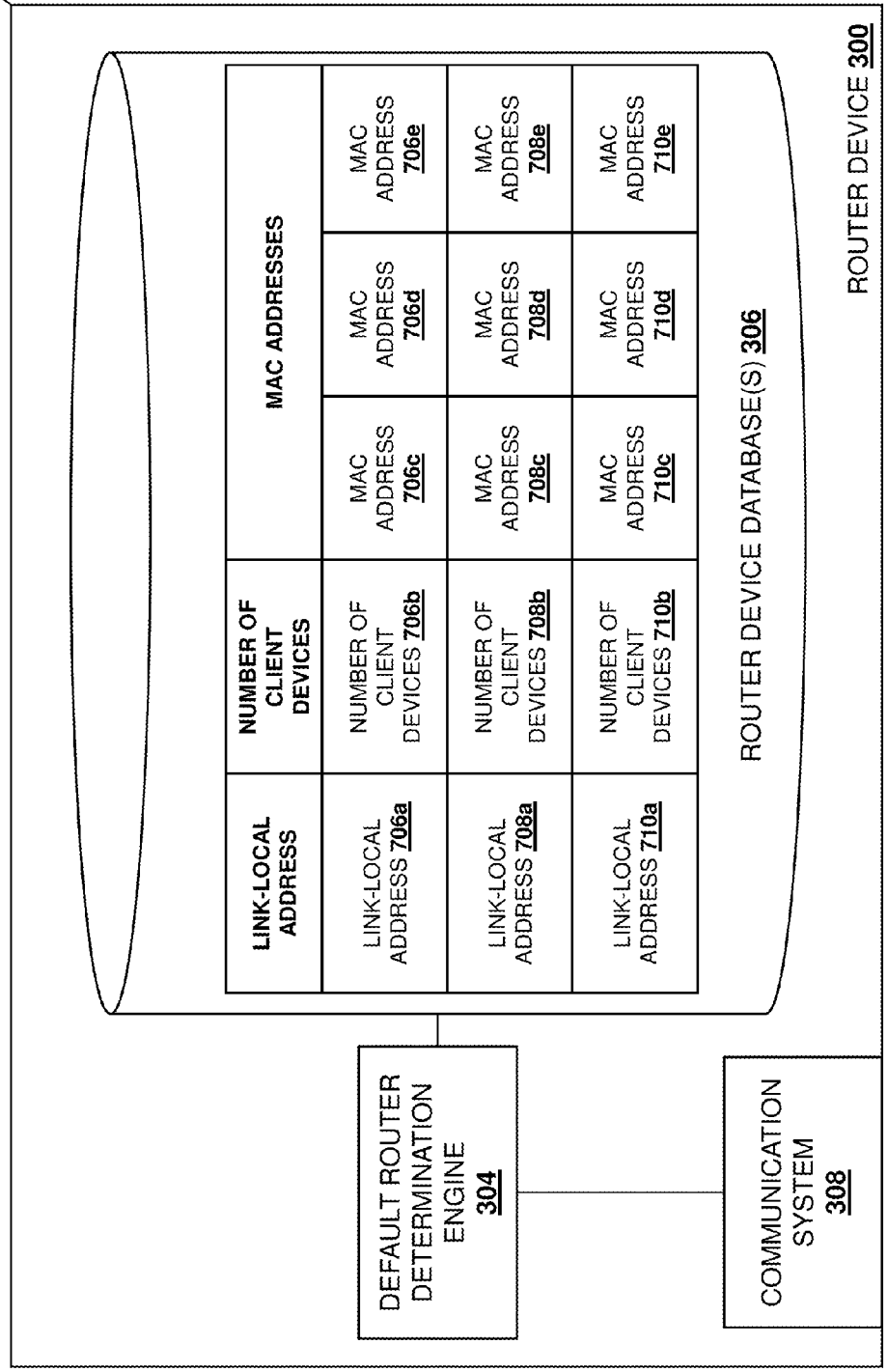

FIG. 7c illustrates an embodiment of the router device 300 with its router device database 306 storing the database information discussed above. As such, the router device 300 may be an example of a router device that retrieves and sends the database information to another router device, or a router device that receives the database information from another router device and stores that database information in its router device database(s) 300. One of skill in the art in possession of the present disclosure will recognize that router devices in the multi-homing load balancing system 200 may synchronize their router device database(s) 306 using the database information sharing discussed above such that each of the router devices may access the information including the number of client devices associated with different link-local addresses (i.e., how many client devices have selected any particular router device as a default router device, as discussed below).

The method 500 then proceeds to block 504 where a first client device sends a neighbor solicitation to the router devices that includes each link-local address that was received in the router advertisements at block 502. At block 502, subsequent to the default router setting engine 404 in the client device 212a receiving the router advertisements 602 and 604 that were sent by the router devices 206a and 206b through its communication system 408, determining that the flag 606a in the router advertisement packet 606 has been set, and determining that traffic should be sent to an destination that requires a default router device selection (e.g., because a default router device is not currently selected for that client device), the default router setting engine 404 in the client device 212a sends a neighbor solicitation. Similarly as discussed above, one of skill in the art in possession of the present disclosure will understand that client devices in the multi-homing load balancing system 200 that are not enabled to perform the multi-homing load balancing operations described herein will ignore the flag 606a set in the router advertisement packet 606 (as it is a reserved router advertisement flag), and will instead process the router advertisement packet 606 conventionally. Referring to FIG. 8a, communications 800 in which the client device 212a sends neighbor solicitations 802 to each of the router devices 206a and 206b is illustrated. In an embodiment, the default router selection engine 404 in the client device 212a may generate and send a neighbor solicitation 802 to each of the router devices in the multi-homing load balancing system 200 (e.g., via an "all routers" communication to each of the link-local addresses of those router devices)

Figure 8B:
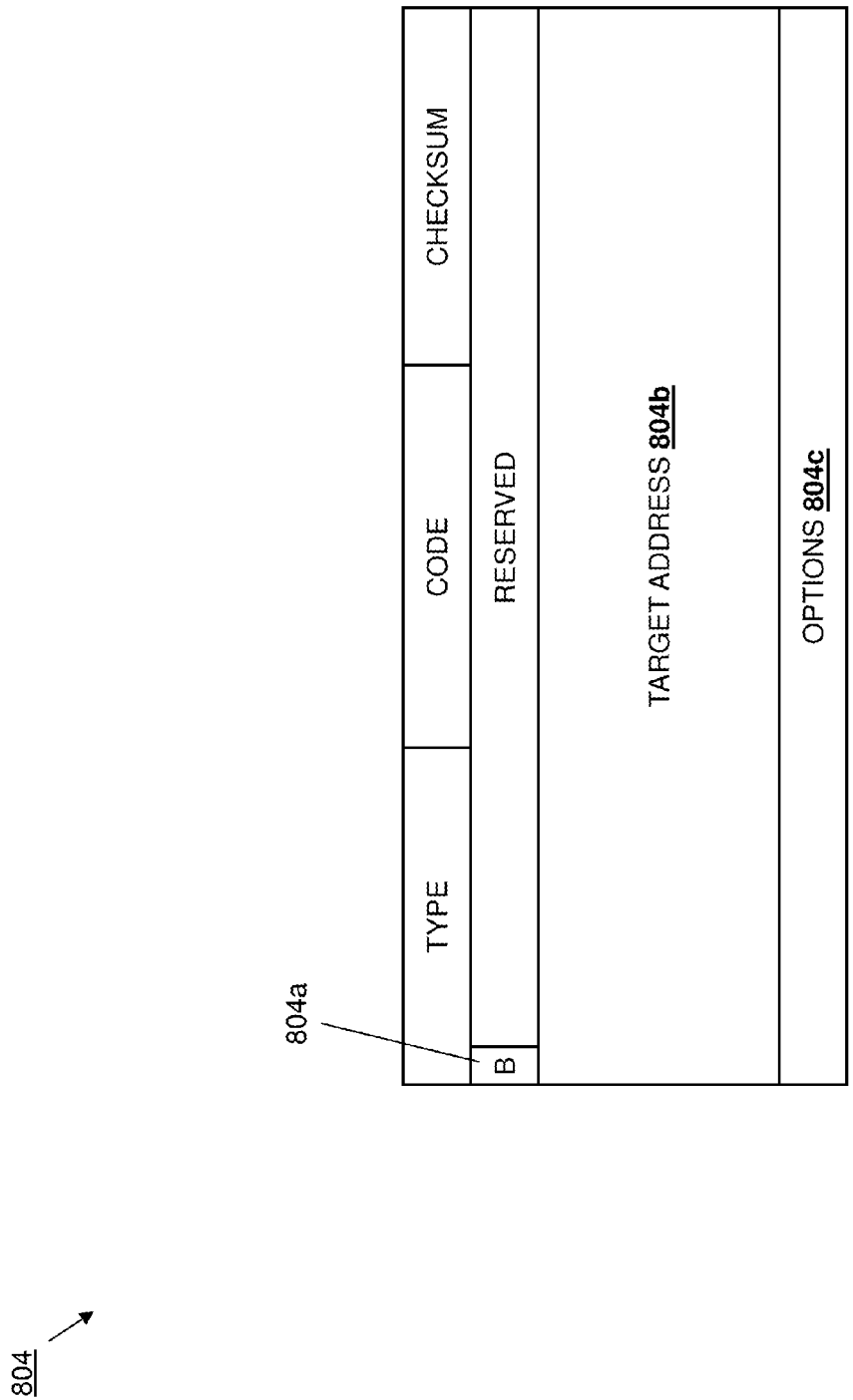

FIG. 8b illustrates an embodiment of a neighbor solicitation packet 804 that may be the neighbor solicitations 802. In the specific example of FIG. 8b, the neighbor solicitation packet 804 may be a type 135 packet according to the Neighbor Discovery Protocol. In the illustrated embodiment the neighbor solicitation packet 804 includes a flag 804a (indicated by the letter "B") that has been set to identify to the router devices 206a and 206b that multi-homing load balancing operations may be performed. For example, the flag 804a may be a flag that has been set in one of the reserved fields in the neighbor solicitation packet 804. In an embodiment, a target address 804b in the neighbor solicitation packet 804 may include a reserved address (e.g., "fe80:1::0"). In an embodiment, an options field 804c in the neighbor solicitation packet 804 may include each of the router devices (e.g., their link-local addresses) from which the client device 212a received a router advertisement from (e.g., a neighbor solicitation packet 804 from the client device 212a would include the "FE80::260:3EFF:FE11:6770" link-local address of router device 206a and the "FE80::7686:7aff:feff:7186" link-local address of router device 206b in its options field 804c). While a specific neighbor solicitation packet is illustrated and described herein, one of skill in the art in possession of the present disclosure will recognize that neighbor solicitations may take a variety of forms and be sent in a variety of manners that will fall within the scope of the present disclosure.

The method 500 then proceeds to block 506 were the router devices communicate with each other to determine a first router device that will respond to the neighbor solicitation. At block 504, the default router determination engine 304 in the router devices 206a and/or 206b may receive the neighbor solicitation 802 that was sent by the client device 212a through its communication system 308 and, in response to determining that the flag 804a in the neighbor solicitation packet 804 has been set, communicate with the other router(s) as discussed below. Similarly as discussed above, one of skill in the art in possession of the present disclosure will understand that router devices in the multi-homing load balancing system 200 that are not enabled to perform the multi-homing load balancing operations described herein will ignore the flag 804a set in the neighbor solicitation packet 804 (as it is a reserved flag), and will instead process the neighbor solicitation packet 804 conventionally. In an embodiment, if the default router determination engine 304 in the router devices 206a and/or 206b determines that a neighbor solicitation packet 804 having the flag 804a set has been received at block 504 by a client device that is already associated with a default router device in its router device database(s) 306 (e.g., via a link-local address/client device address (MAC address) association), the default router determination engine 304 may remove that association from the router device database(s) 306.

In response to receiving the neighbor solicitation, the default router determination engine 304 in each router device 206a and 206b may start a timer and, on the expiration of some time period determined via that timer, that default router determination engine 304 may send a notification to the other router devices in the multi-homing load balancing system 200 that indicates a willingness to respond to the neighbor solicitation message 802. In a specific example, the timer started by the default router determination engine 304 may be random timer that counts down a time period between zero and one second, although other types of timers and other time periods will fall within the scope of the present disclosure. Referring to FIG. 9a, communications 900 in which the router device 206a provide a notification 902 to the router device 206b is illustrated. In an embodiment, the default router determination engine 304 in the router device 206a may determine that its timer has expired and, in response, may generate and send a notification 902 through its communication system 308 to the router device 206b. In response to receiving a notification from another router device expressing a willingness to respond to a neighbor solicitation, the router device will not respond to the neighbor solicitation 802. As such, the default router determination engine 304 may receive the notification 902 through its communication system 308 and determine to not reply to the neighbor solicitation 802. It is unlikely for multiple router devices to receive notifications from each other (as each may send its notification based on the random timer above). However, in such a situation a router device receiving a notification from another router device after sending a notification itself may ignore that received notification, restart its timer, and resend a notification at the expiration of that timer.

FIG. 9b illustrates an embodiment of a notification packet 904 that may be the notification 902. In the illustrated embodiment, the notification packet 904 includes a row 906. For example, the row 906 includes a link-local address 706a that is used by one of the router devices in the multi-homing load balancing system 200, along with an entry 906b including a number of client devices that have selected the routing device associated with the link-local address 906a as their default router device (discussed in further detail below), and entries 906c, 906d, and up to 906e that include client device address(es) (e.g., MAC addresses in the illustrated embodiment) for the client devices that have selected the routing device associated with the link-local address 906a as their default router device. While a specific notification packet is illustrated and described herein, one of skill in the art in possession of the present disclosure will recognize that the notifications sent by router devices may take a variety of forms and be sent in a variety of manners that will fall within the scope of the present disclosure.

One of skill in the art in possession of the present disclosure will recognize that notifications may be sent by the router devices multiple times during the method 500. For example, a first notification may be sent by the router devices to indicate a willingness to respond to the neighbor solicitation as discussed above, while a second notification may be sent once a router device has been selected to respond as discussed above. In such examples, the first notification may have an initial flag (e.g., an "I" flag) set and may not include information about link-local addresses, numbers of client devices, and MAC addresses, while the second notification may not have an initial flag set and may include the link-local addresses, numbers of client devices, and MAC addresses illustrated in FIG. 9b.

The method 500 then proceeds to block 508 where a first router device selects a link local address of one of the router devices and sends a neighbor advertisement to the first client device that includes that link-local address. At block 506, the default router determination engine 304 in the router device 206a may have sent the notification 902 before receiving any notifications from other routing devices (e.g., the routing device 206b) in the multi-homing load balancing system 200 and, as such, the default router determination engine 304 in the router device 206a may determine that the router device 206a will respond to the neighbor solicitation 802 received from the client device 212a. In response, the default router determination engine 304 in the router device 206a may then select one of the link-local addresses that were received in the neighbor solicitation 802 from the client device 212a. It is noted that the link-local address selected by the first router device from those included in the neighbor solicitation 802 may be the link-local address of the first router device or a link-local address of a different router device in the multi-homing load balancing system 200.

In an embodiment, the selection of one of the link-local addresses that were received in the neighbor solicitation 802 may be performed based on that link-local address being associated with a router device that has been selected as a default router device by the fewest number of client devices. For example, a first link-local address for a first router device may be selected over a plurality of other link-local addresses for other router devices based on the first router device having been selected by the fewest number of client devices as a default router device. In a specific example, the default router determination engine 304 in the router device 206a may compare each of the link-local addresses received in the neighbor solicitation 802 to its router device database(s) 308 to determine which of those link-local addresses included in the neighbor solicitation 802 is associated with the fewest number of client devices that have selected the router device associated with that link-local address as their default router device and, at block 508, generate a neighbor advertisement that includes that link-local address. One of skill in the art in possession of the present disclosure will recognize that the selection of router devices in such a manner for plurality of different client devices in the multi-homing load balancing system 200 will result in those client devices designing router devices in the multi-homing load balancing system 200 as default router devices in a deterministic manner such that subsequent traffic sent by the client devices to those default router devices will be load balanced across those router devices.

Figure 10B:
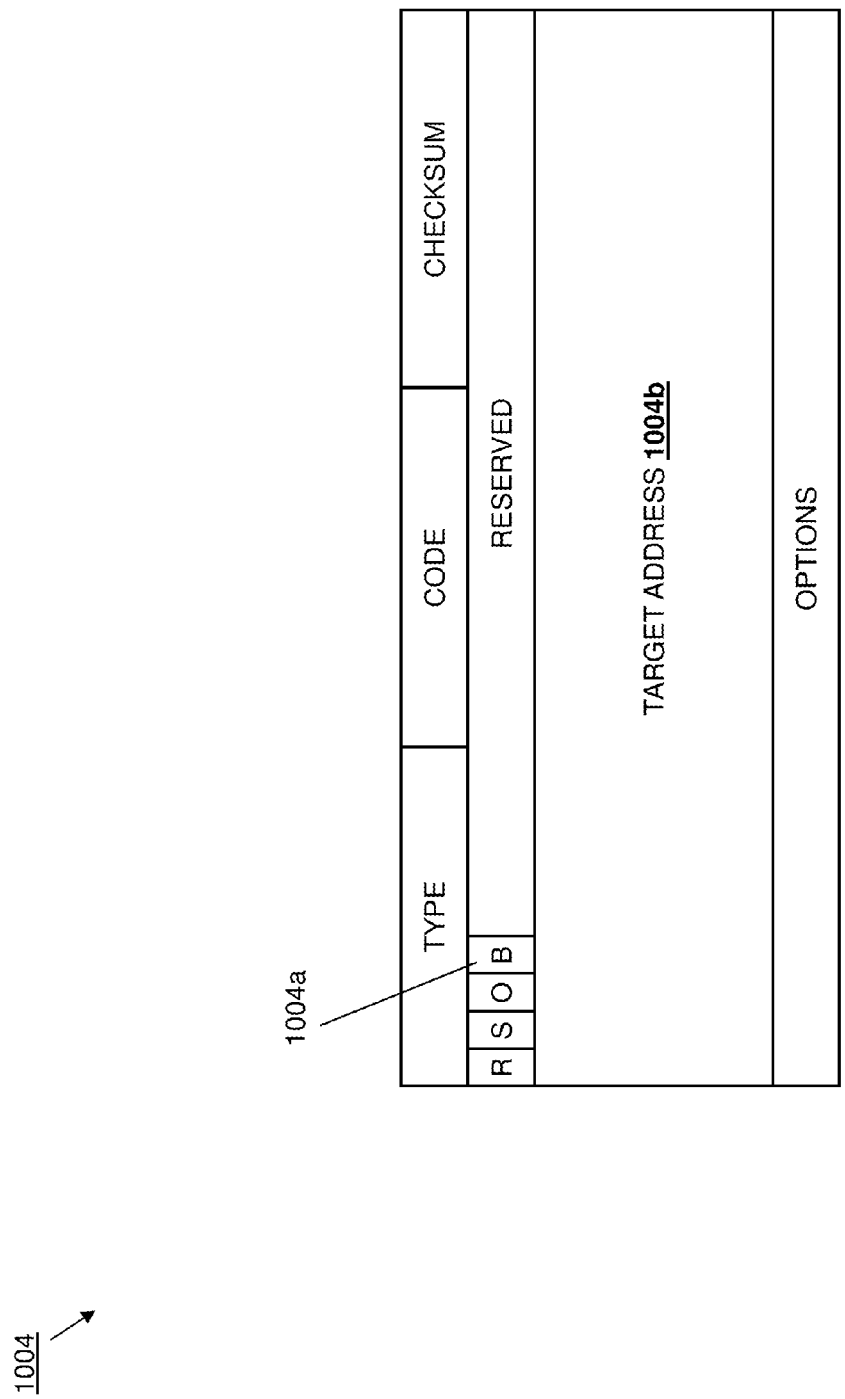

Referring to FIG. 10a, communications 100 in which the router device 206a sends a neighbor advertisement 1002 to the client device 212a is illustrated. In an embodiment, the default router determination engine 304 in the router device 206a may generate and send a neighbor advertisement 1002 including the selected link-local address through its communication system 308 to the client device 212a. While specific selection criteria for selecting a link-local address at block 508 has been described herein, one of skill in the art in possession of the present disclosure will recognize that other selection criteria may provide for load balancing in a multi-homing system and thus will fall within the scope of the present disclosure FIG. 10b illustrates an embodiment of a neighbor advertisement packet 1004 that may be the neighbor advertisement 1002. In the specific example of FIG. 10b, the neighbor advertisement packet 1004 may be a type 136 packet according to the Neighbor Discovery Protocol. In the illustrated embodiment the neighbor advertisement packet 1004 includes a flag 1004a (indicated by the letter "B") that has been set to identify to the client device 212a that multi-homing load balancing operations may be performed. For example, the flag 1004a may be a flag that has been set in one of the reserved fields in the neighbor advertisement packet 1004. In an embodiment, the neighbor advertisement packet 1004 may also include the selected link-local address discussed above in as the target address 1004b. While a specific neighbor advertisement packet is illustrated and described herein, one of skill in the art in possession of the present disclosure will recognize that neighbor advertisements may take a variety of forms and be sent in a variety of manners that will fall within the scope of the present disclosure.

The method 500 may then proceed to block 510 where the first client device selects the router device associated with the link-local address received in the neighbor advertisement as its default router device. In an embodiment, the default router setting engine 404 in the client device 212a receives the neighbor advertisement 1002 through its communication system 408 and, in response to determining that the flag 1004a in the neighbor advertisement packet 1004 has been set, retrieves the selected link-local address and uses that link-local address to select the router device associated with that link-local address as its default router device. Similarly as discussed above, one of skill in the art in possession of the present disclosure will understand that client devices in the multi-homing load balancing system 200 that are not enabled to perform the multi-homing load balancing operations described herein will ignore the flag 1004a set in the neighbor advertisement packet 1004 (as it is a reserved flag), and will instead process the neighbor advertisement packet 1004 conventionally.

Figure 11:
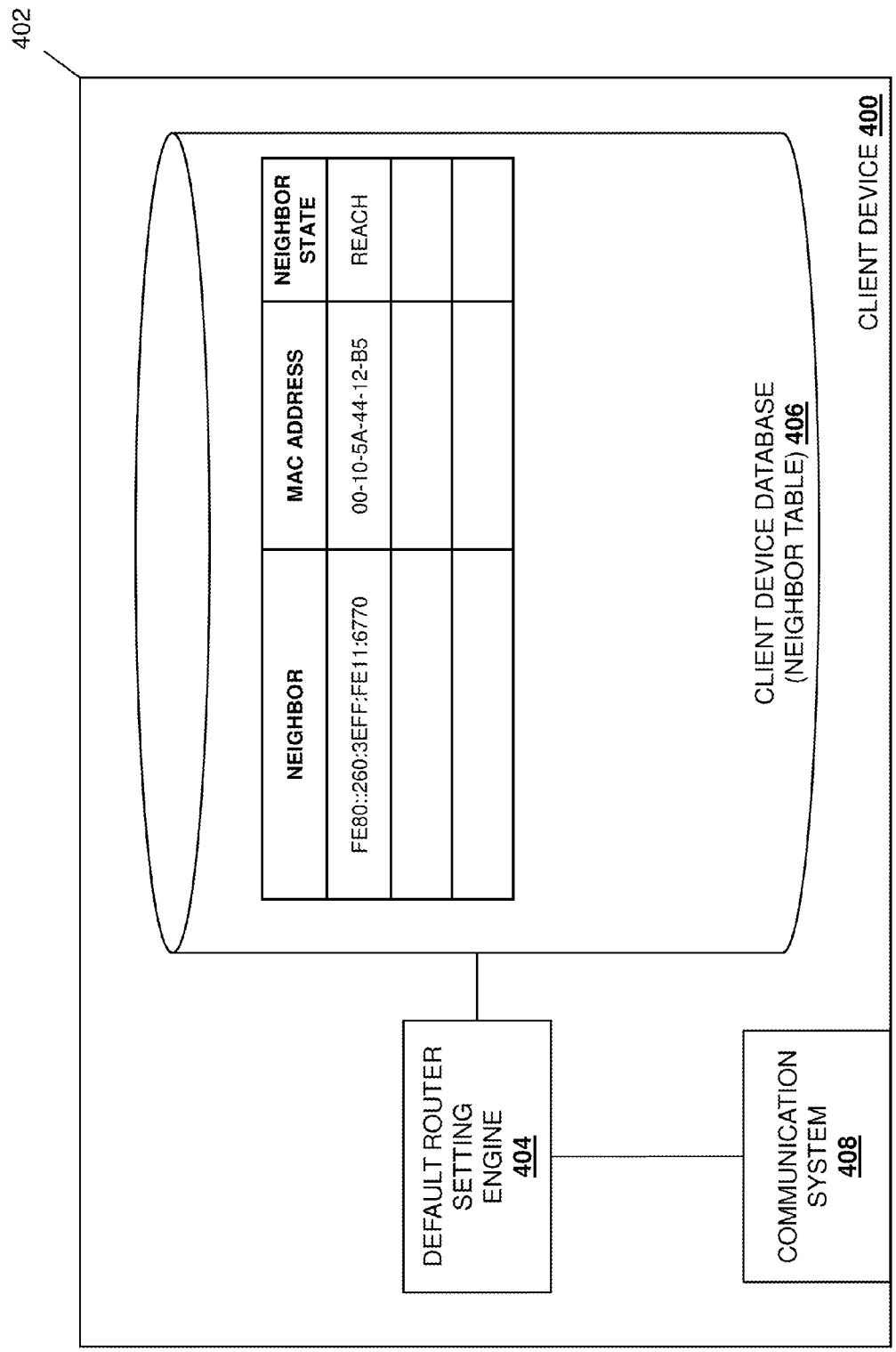

In some embodiments (e.g., multi-homing load balancing systems that do not implement secure Neighbor Discovery Protocol), the default router setting engine 404 may confirm that the selected link-local address received in the neighbor advertisement 1002 is valid by confirming that that link-local address was one of the link-local addresses that were sent in the neighbor solicitation 802 prior to selecting the router device associated with that link-local address as its default router device. FIG. 11 illustrates an embodiment of the client device 400 with its client device database(s) 400 including a neighbor (e.g., the "FE80::260:3EFF:FE11:6770" link-local address of router device 206a) that describes its selected default router device associated with its client device address (e.g., a "00-10-5A-44-12-B5" MAC address) and a neighbor state of "REACH". In one example, the REACH designation in the neighbor state may cause the association in the client device database(s) of the link-local address and the client device address to be sent to the router device(s) for storage in the router device database(s) 306. Subsequent to selecting its default router device, the first client device may direct its communications (e.g., IPv6 communications) through that default router device to be forwarded on through the network 204 by the Internet Service Provider system 202a or 202b.

Thus, systems and methods have been described that provide for load balancing in a multi-homing system by enabling the selection of default router devices by client devices in a determinative manner that results in traffic from the client devices being distributed across the router devices in more balanced manner than is possible using conventional load balancing techniques. In an embodiment, the Neighbor Discovery Protocol is utilized via reserved flags and router advertisements, neighbor solicitations, and neighbor advertisements in order to cause the client devices and router devices to perform the specific functionality detailed above that provides for the determination of default router devices by the router devices and the selection of those default router devices by the client systems. The systems and methods may be implemented with client devices and/or router devices that do not support those systems and methods, as those non-supporting client devices and/or router devices may simply process the communications discussed above in a conventional manner, thus providing backwards compatibility with legacy devices. Further enhancements to the systems and methods of the present disclosure may include router devices setting a timer for each MAC association when general neighbor solicitations are received, restarting that timer, removing link-local address/client address device associations if that timer expires and no general neighbor solicitations are received, and sending notifications of such association removals to other router devices if they occur. In such enhancements, the timer may only be set for MAC addresses associated with link-local addresses of a router device, and the timer may be set at three times the REACH time in the neighbor status.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-homing load balancing system, comprising:
a plurality of router devices; and
a client device coupled to the plurality of router devices, wherein the client device is configured to receive a respective router advertisement from each of the plurality of router devices that includes a link-local address for that router device and, in response, provide a neighbor solicitation to each of the plurality of router devices that includes the plurality of link-local addresses that were received in the router advertisements;
wherein one of the plurality of router devices is configured, in response to a determination that the one of the plurality of router devices is to respond to the neighbor solicitation based on communications between the plurality of router devices, to respond to the neighbor solicitation by:
selecting a first link-local address of the plurality of link-local addresses that were included in the neighbor solicitation based on the first link-local address being associated with the fewest client devices when compared with the plurality of link-local addresses that were included in the neighbor solicitation; and
providing the first link-local address to the client device in a neighbor advertisement, wherein the client device is configured to select a first router device associated with the first link-local address as a default router device in response to receiving the neighbor advertisement.

2. The system of claim 1, wherein each of the plurality of router devices is configured to share a database storing associations between link-local addresses and client device addresses with the others of the plurality of router devices.

3. The system of claim 1, wherein each of the router advertisements includes a first flag that identifies to the client device to provide the neighbor solicitation, the neighbor solicitation includes a second flag that identifies to the router device to provide the neighbor advertisement, and the neighbor advertisement includes a third flag that identifies to the client device to select the default router device.

4. The system of claim 1, wherein the client device is configured to direct Internet Protocol version 6 (IPv6) communications to the first router device subsequent to selecting the first router devices as the default router device.

5. An information handling system (IHS), comprising:
a communication system that is configured to couple to a client device;
a processing system that is coupled to the communication system; and
a memory system that is coupled to the processing system and that stores a first link-local address, wherein the memory system includes instructions that, when executed by the processing system, cause the processing system to provide a default router determination engine that is configured to:
send, through the communication system to the client device, a router advertisement that includes the first link-local address;
receive, through the communication system from the client device, a neighbor solicitation that includes a plurality of link-local addresses that include the first link-local address and at least one second link-local address;
communicate, through the communication system, with a plurality of router devices to determine that a response will be provided to the neighbor solicitation by the communication system; and
respond to the neighbor solicitation by selecting one of the plurality of link-local addresses that were included in the neighbor solicitation based on that link-local address being associated with the fewest client devices when compared with the others of the plurality of link-local addresses that were included in the neighbor solicitation and providing, through the communication system to the client device, that link-local address in a neighbor advertisement that is configured to cause the client device to select a first router device associated with that link-local address as a default router device.

6. The IHS of claim 5, wherein the default router determination engine is configured to:
share, through the communication system with a plurality of router devices, a database storing associations between link-local addresses and client device addresses.

7. The IHS of claim 5, wherein the router advertisement includes a first flag that identifies to the client device to provide the neighbor solicitation, the neighbor solicitation includes a second flag that identifies to the default router determination engine to provide the neighbor advertisement, and the neighbor advertisement includes a third flag that identifies to the client device to select the default router device.

8. The IHS of claim 5, wherein the default router determination engine is configured to:
provide, through the communication system, Internet Protocol version 6 (IPv6) communications.

9. The IHS of claim 5, wherein the default router determination engine is configured to:
associate the one of the plurality of link-local addresses that was provided in the neighbor advertisement with a client device address of the client device in the memory system.

10. A method for load balancing a multi-homing system, comprising:
sending, by a first router device to a client device, a router advertisement that includes the first link-local address of the first router device;
receiving, by the router device from the client device, a neighbor solicitation that includes the first link-local address and a second link local address of a second router device;
communicating, by the first router device with the second router device, to determine that a response will be provided to the neighbor solicitation by the first router device; and
responding, by the first router device, to the neighbor solicitation by selecting one of the first link-local address and the second link-local address that were included in the neighbor solicitation based on that link-local address being associated with the fewest client devices when compared with the other link-local address and providing, to the client device, that link-local address in a neighbor advertisement that causes the client device to select the router device associated with that link-local address as a default router device.

11. The method of claim 10, further comprising:
sharing, by the first router device with the second router device, a database storing associations between link-local addresses and client device addresses.

12. The method of claim 10, wherein the router advertisement includes a first flag that identifies to the client device to provide the neighbor solicitation, the neighbor solicitation includes a second flag that identifies to the first router device to provide the neighbor advertisement, and the neighbor advertisement includes a third flag that identifies to the client device to select the default router device.

13. The method of claim 10, further comprising:
directing, by the client device, Internet Protocol version 6 (IPv6) communications through the default router device.

14. The method of claim 10, further comprising:
associating, by the first router device, the one of the first link-local address and the second link-local address that was provided in the neighbor advertisement with a client device address of the client device.

* * * * *